(12) United States Patent
Wachtfogel et al.

(10) Patent No.: US 11,669,227 B2
(45) Date of Patent: Jun. 6, 2023

(54) GENERATING A VIDEO FRAME FOR A USER INTERFACE OPERATION DURING CONTENT PRESENTATION

(71) Applicant: Synamedia Limited, Staines Upon Thames (GB)

(72) Inventors: Zorach Reuven Wachtfogel, Elazar (IL); Anthony Leigh, Workingham (GB)

(73) Assignee: Synamedia Limited, Staines Upon (GB)

(*) Notice: Subject to any disclaimer, the term of this patent is extended or adjusted under 35 U.S.C. 154(b) by 65 days.

(21) Appl. No.: 17/232,981

(22) Filed: Apr. 16, 2021

(65) Prior Publication Data
US 2022/0334692 A1 Oct. 20, 2022

(51) Int. Cl.
| | |
|---|---|
| H04N 21/431 | (2011.01) |
| H04N 21/00 | (2011.01) |
| G06F 3/048 | (2013.01) |
| G11B 27/10 | (2006.01) |
| G06F 3/0484 | (2022.01) |

(52) U.S. Cl.
CPC ............ *G06F 3/0484* (2013.01); *G11B 27/10* (2013.01); *H04N 21/00* (2013.01); *H04N 21/431* (2013.01)

(58) Field of Classification Search
CPC .... H04N 21/00; H04N 21/431; G06F 3/0484; G11B 27/10

USPC .......................................................... 725/40
See application file for complete search history.

(56) References Cited

U.S. PATENT DOCUMENTS

| | | | |
|---|---|---|---|
| 11,223,873 B1* | 1/2022 | Keifer, III | H04N 21/6332 |
| 2006/0020966 A1* | 1/2006 | Poslinski | G09B 5/00 |
| | | | 386/E5.07 |
| 2007/0180466 A1* | 8/2007 | Ando | H04N 5/775 |
| | | | 348/E5.007 |
| 2017/0150206 A1* | 5/2017 | Hu | H04N 21/8456 |
| 2020/0326848 A1* | 10/2020 | Amini | G06F 3/0416 |
| 2021/0185384 A1* | 6/2021 | Raikar | H04N 21/8455 |

* cited by examiner

*Primary Examiner* — Dominic D Saltarelli
(74) *Attorney, Agent, or Firm* — Fernando & Partners, LLP

(57) ABSTRACT

In some implementations, a device includes one or more processors and a non-transitory memory. In some implementations, a method includes obtaining a request to perform a user interface operation at a client device while the client device is playing a media content item in a buffered content presentation mode. In some implementations, the method includes identifying a first image that represents a current playback position of the media content item at the client device. In some implementations, the method includes identifying a second image that represents a user interface element associated with the user interface operation. In some implementations, the method includes generating a first video frame that corresponds to the user interface operation by blending the first image with the second image. In some implementations, the method includes triggering the client device to present the first video frame in a real-time content presentation mode.

20 Claims, 12 Drawing Sheets

GENERATING A VIDEO FRAME FOR A USER INTERFACE OPERATION DURING CONTENT PRESENTATION

TECHNICAL FIELD

The present disclosure generally relates to generating a video frame for a user interface operation being performed at a client device during content presentation.

BACKGROUND

Some devices are capable of presenting content that includes video content. While a device is playing video content, a user of the device may provide a user input that corresponds to a request to perform a user interface operation with respect to the video content.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
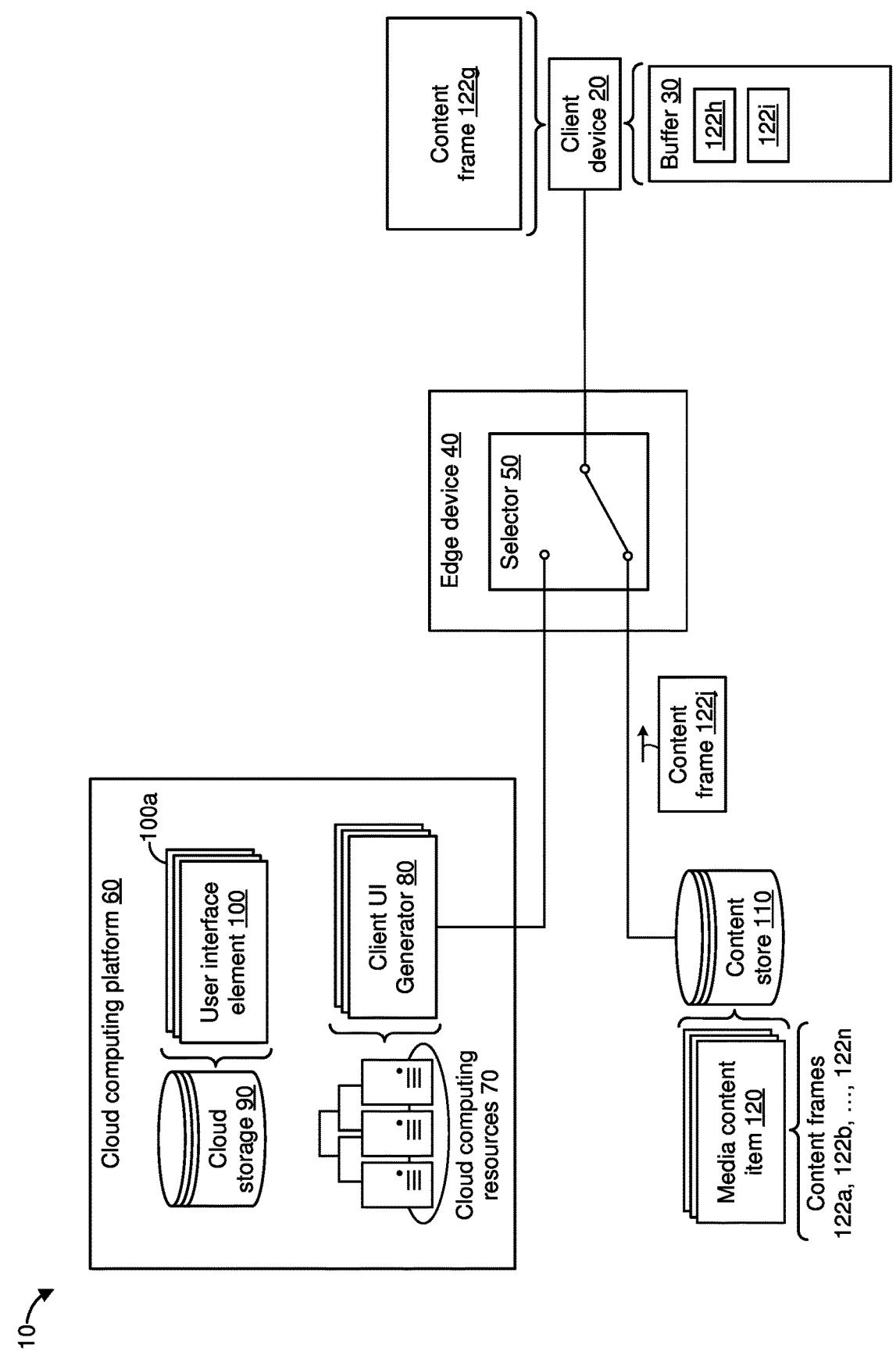
FIGS. 1A-1I are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for generating a video frame for a user interface operation being performed at a client device during content presentation. In some implementations, a device includes one or more processors and a non-transitory memory. In some implementations, a method includes obtaining a request to perform a user interface operation at a client device while the client device is playing a media content item in a buffered content presentation mode. In some implementations, the method includes identifying a first image that represents a current playback position of the media content item at the client device. In some implementations, the method includes identifying a second image that represents a user interface element associated with the user interface operation. In some implementations, the method includes generating a first video frame that corresponds to the user interface operation by blending the first image with the second image. In some implementations, the method includes triggering the client device to present the first video frame in a real-time content presentation mode.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

Example Embodiments

During playback of a media content item in a buffered content presentation mode, a user of a client device can provide a user input that corresponds to a request to perform a user interface operation such as a scrubbing operation. The user interface operation may require presenting a user interface element at the client device. For example, the scrubbing operation may require presentation of a scrub bar that includes a portion of the media content item that may not be stored in a buffer of the client device. However, the client device may not include a sufficient amount of computing resources to render the user interface element. For example, the client device may not have sufficient computing resources to render the scrub bar. Additionally, rendering the user interface element at the client device may result in a time delay thereby adversely impacting a user experience of the client device. For example, rendering the scrub bar at the client device may require the client device to wait a non-trivial amount of time for the video frame requested by the scrubbing operation.

The present disclosure provides methods, systems, and/or devices for generating a video frame that corresponds to a user interface operation being performed at a client device while the client device is presenting a media content item in a buffered content presentation mode. A device identifies a first image that represents a current playback position of the media content item at the client device. The device identifies a second image that represents a user interface element that is associated with the user interface operation being performed at the client device. The device generates the video frame by blending the first image with the second image. For example, the device overlays the second image onto the first image. The device triggers the client device to present the video frame in a real-time content presentation mode.

The device can generate a sequence of video frames that provides an appearance that the media content item has been automatically paused while the user interface operation is being performed at the client device. As the user interface operation continues, a state of the user interface element may change and the device overlays different images of the user interface element onto the same image of the media content item in order to provide an appearance that playback of the media content item has been paused at the client device. The device can automatically pause the playback of the media content item at the client device during the user interface operation when resource availability data indicates that an amount of resources (e.g., a number of resources) available to the client device is less than a threshold amount of resources (e.g., a threshold number of resources). For example, the device can automatically pause the playback of the media content item when an amount of bandwidth that is available to the client device is less than a threshold amount of bandwidth. Additionally or alternatively, the device can automatically pause the playback of the media content item at the client device during the user interface operation when a size of the user interface element exceeds a threshold size and the user is less likely to focus on the media content item.

FIG. 1A is a diagram that illustrates an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes a client device 20, an edge device 40, a cloud computing platform 60 and a content store 110. In some implementations, the edge device 40 is a part of an edge computing network (not shown).

In various implementations, the content store 110 stores a set of one or more media content items 120. In some implementations, a media content item 120 (e.g., each of the media content items 120) includes a set of content frames (e.g., a first content frame 122a, a second content frame 122b, . . . , and an nth content frame 122n). Although the content store 110 is shown as being separate from the edge device 40 and the cloud computing platform 60, in some implementations, the content store 110 is integrated into the edge device 40 and/or the cloud computing platform 60. In some implementations, the content store 110 includes a distributed storage system.

In some implementations, the client device 20 is coupled with a display. For example, in some implementations, the client device 20 includes a dongle that is connected to a television. Alternatively, in some implementations, the client device 20 is integrated into a display (e.g., a television). In the example of FIG. 1A, the client device 20 is presenting one of the media content items 120 in a buffered content presentation mode. As shown in FIG. 1A, the client device 20 includes a buffer 30. In the buffered content presentation mode, the client device 20 retrieves a content frame from the buffer 30 and presents the retrieved content frame on a display that is coupled with the client device 20 (e.g., on a television that is connected to the client device 20). In the example of FIG. 1A, the client device 20 is currently presenting a gth content frame 122g on a display coupled with the client device 20, the buffer 30 currently stores an hth content frame 122h that will be presented after the gth content frame 122g and an ith content frame 122i that will be presented after the hth content frame 122h. Additionally, the edge device 40 is retrieving a jth content frame 122j from the content store 110 in order to transmit the jth content frame 122j to the client device 20 for temporary storage in the buffer 30 and subsequent presentation on a display coupled with the client device 20.

In various implementations, when the client device 20 is presenting content in the buffered content presentation mode, the client device 20 receives content frames from the edge device 40, and the client device 20 stores the received content frames in the buffer 30 until it is time to present the content frames. By contrast, when the client device 20 is presenting content in a real-time content presentation mode, the client device 20 receives a video frame from the edge device 40 and/or the cloud computing platform 60, and the client device 20 presents the received video frame without storing the received video frame in the buffer 30.

In some implementations, the edge device 40 includes a selector 50 that selects a content presentation mode for the client device 20. In some implementations, the selector 50 selects between the buffered content presentation mode and the real-time content presentation mode for the client device 20. In the buffered content presentation mode, the selector 50 forwards content frames (e.g., the jth content frame 122j) from the content store 110 to the client device 20 and instructs the client device 20 to store the content frames in the buffer 30 until it is time to present the content frames. By contrast, in the real-time content presentation mode, the selector 50 forwards user interface (UI) frames (e.g., video frames that depict UI elements) from the cloud computing platform 60 to the client device 20 and instructs the client device 20 to present the UI frames immediately (e.g., without first storing the UI frames in the buffer 30). In some implementations, the selector 50 is referred to as a switching application that controls switching of the client device 20 between the buffered content presentation mode and the real-time content presentation mode. In some implementations, the edge device 40 implements the selector 50 by storing and executing a set of computer-readable instructions that correspond to the selector 50.

In various implementations, the cloud computing platform 60 includes cloud computing resources 70 and cloud storage resources 90 ("cloud storage 90", hereinafter for the sake of brevity). In some implementations, the cloud computing resources 70 includes server computers with numerous processors. In some implementations, the cloud computing resources 70 implement a set of one or more client UI generators 80 that generate UI frames for client devices such as the client device 20. In some implementations, a single instance of a client UI generator 80 generates UI frames for a single client device at a given time. Alternatively, in some implementations, a single instance of a client UI generator 80 can generate UI frames for multiple client devices. In some implementations, the client UI generator 80 is referred to as a UI application. In some implementations, the cloud computing resources 70 implement an instance of the client UI generator 80 by executing a set of computer-readable instructions that correspond to the client UI generator 80.

In some implementations, the cloud storage 90 stores images 100 of user interface elements ("UI images 100" or "UI element images 100", hereinafter for the sake of brevity). In some implementations, the UI images 100 include a scrub bar image 100a that represents a scrub bar that is displayed at the client device 20 during a scrubbing operation. In some implementations, the UI images 100 include a volume bar image that represents a volume bar that is displayed at the client device 20 during a volume adjustment operation. In some implementations, the UI images 100 include an information box image (e.g., an image of a text box that provides information regarding a media content item) that is displayed at the client device 20 during a user interface operation that corresponds to a request to display information regarding a media content item. In some implementations, the UI images 100 include a subtitle bar image that is displayed at the client device 20 in response to a user interface operation that corresponds to a request to display subtitles for a media content item. In some implementations, the UI images 100 include bitmaps.

Figure 1B:
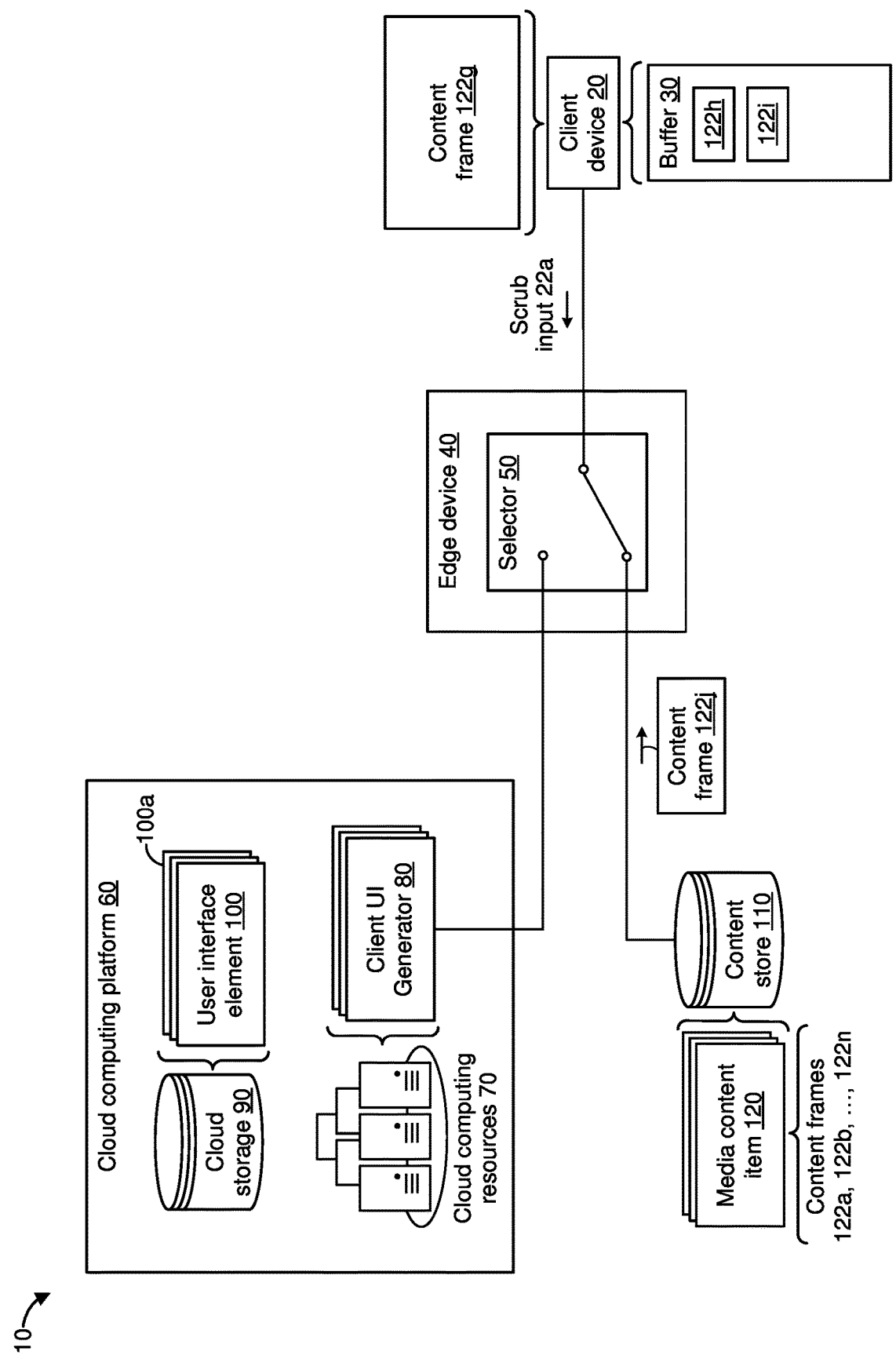

Referring to FIG. 1B, in various implementations, the client device 20 provides an indication to the edge device 40 and/or the cloud computing platform 60 that the client device 20 has detected a user input that corresponds to a request to perform a user interface operation. In the example of FIG. 1B, the user input includes a first portion of a scrub input 22a that corresponds to a request to perform a scrubbing operation. In some implementations, the client device 20 is associated with a remote control and the client device 20 detects the user input by detecting a key press on the remote control. For example, in some implementations, the client device 20 detects the first portion of the scrub input 22a by detecting that a right arrow key on the remote control has been pressed by a user (not shown) of the client device 20. FIG. 1B illustrates that the client device 20 provides an indication of the first portion of the scrub input 22a to the cloud computing platform 60 via the edge device 40. Alternatively, in some implementations, the client device 20 provides the indication of the first portion of the scrub input 22a directly to the cloud computing platform 60 (e.g., without using the edge device 40 as an intermediary to forward the indication of the first portion of the scrub input 22a to the cloud computing platform 60).

Figure 1C:
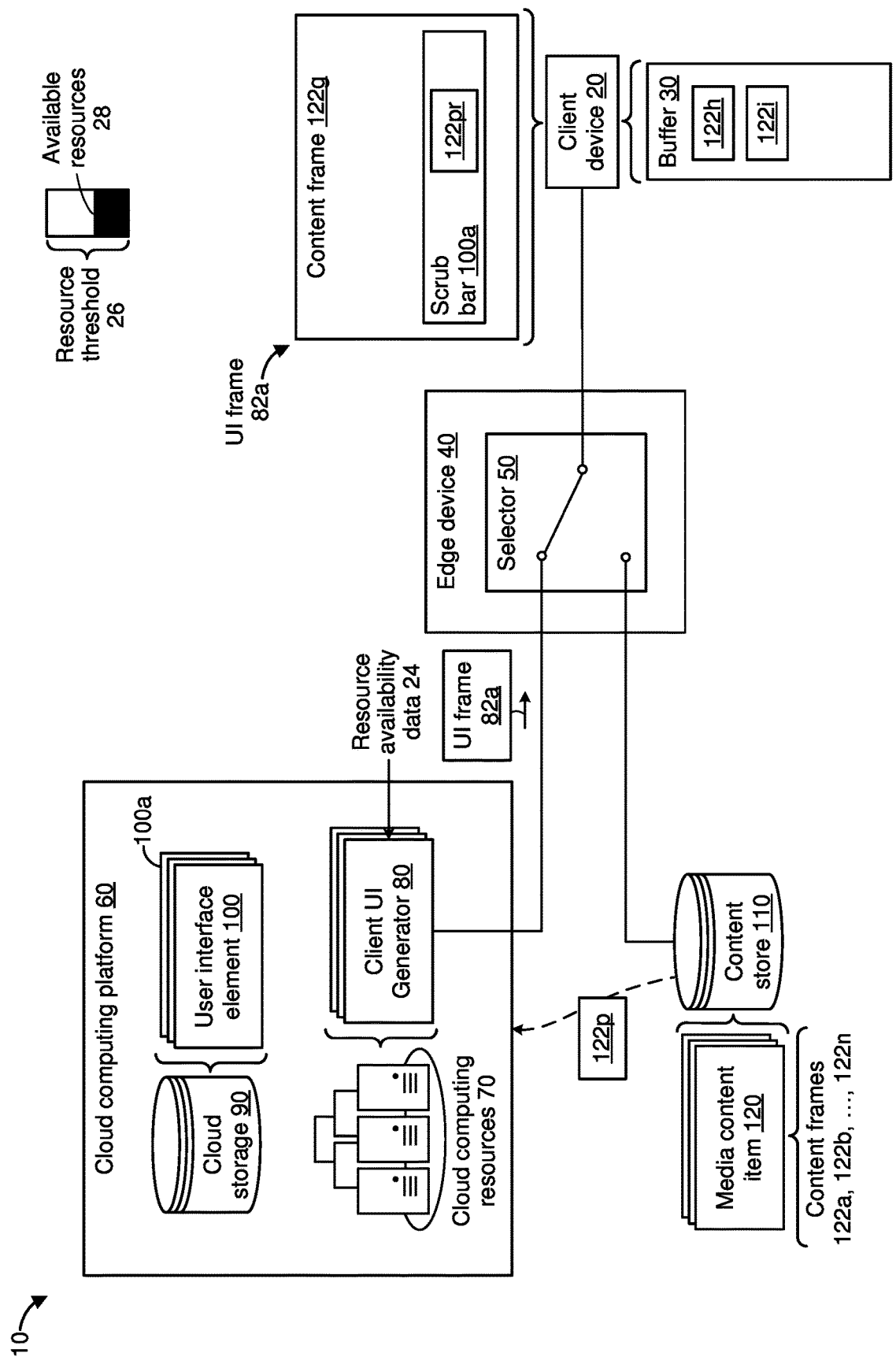

Referring to FIG. 1C, a client UI generator 80 generates a first UI frame 82a for the client device 20 in response to obtaining the indication of the first portion of the scrub input 22a. In the example of FIG. 1C, the client UI generator 80 generates the first UI frame 82a by blending the gth content frame 122g with the scrub bar image 100a. As shown in FIG. 1C, the client UI generator 80 generates the first UI frame 82a by overlaying the scrub bar image 100a onto the gth content frame 122g that the client device 20 was presenting when the client device 20 detected the first portion of the scrub input 22a. More generally, in various implementations, the client UI generator 80 generates a UI frame by blending a content image that represents a current playback position of a media content item that the client device 20 is playing with a UI image of a user interface element invoked by the user interface operation.

In some implementations, the first portion of the scrub input 22a corresponds to a request to view a pth content frame 122p. As such, the client UI generator 80 retrieves the pth content frame 122p from the content store 110 and includes a reduced-size version 122pr of the pth content frame 122p in the first UI frame 82a. In the example of FIG. 1C, the client UI generator 80 has overlaid the reduced-size version 122pr of the pth content frame 122p on top of the scrub bar image 100a, and the client UI generator 80 has overlaid the scrub bar image 100a on top of the gth content frame 122g. In some implementations, the client UI generator 80 generates the reduced-size version 122pr of the pth content frame 122p by reducing a dimension, a resolution and/or a bit rate of the pth content frame 122p.

As indicated by a change in a position of the selector 50 relative to FIG. 1B, the selector 50 has switched the client device 20 from the buffered content presentation mode to the real-time content presentation mode. As such, when the edge device 40 forwards the first UI frame 82a to the client device 20, the client device 20 immediately presents the first UI frame 82a on a display coupled with the client device 20 without first storing the first UI frame 82a in the buffer 30. While the client device 20 is in the real-time content presentation mode, the client device 20 may continue to receive content frames from the edge device 40 and store the received content frames in the buffer 30.

In some implementations, the cloud computing platform 60 (e.g., the client UI generator 80) obtains resource availability data 24 that indicates an amount of resources 28 that is available to the client device 20. In some implementations, the client device 20 transmits the resource availability data 24 to the cloud computing platform 60. Alternatively, in some implementations, the edge device 40 and/or the cloud computing platform 60 determines the resource availability data 24 by monitoring network conditions (e.g., by monitoring a communication link between the edge device 40 and the client device 20). In some implementations, the amount of resources 28 indicates an amount of bandwidth that is available to the client device 20. In some implementations, the amount of resources 28 indicates an amount of computing power that is available to the client device 20.

In some implementations, the client UI generator 80 compares the amount of resources 28 that is available to the client device 20 with a resource threshold 26. For example, in some implementations, the client UI generator 80 compares the amount of bandwidth that is available to the client device 20 with a threshold amount of bandwidth. In some implementations, if the amount of resources 28 is less than the resource threshold 26, the client UI generator 80 generates a sequence of video frames that provides an appearance that playback of the media content item 120 has been paused at the client device 20 while the user interface operation is being performed. In some implementations, the client UI generator 80 provides the appearance that playback of the media content item 120 has been paused by generating a sequence of UI frames in which the same gth content frame 122g is blended with different versions of the scrub bar image 100a. More generally, in various implementations, the client UI generator 80 provides the appearance that playback of the media content item 120 has been paused by generating a sequence of UI frames in which the same content image is blended with changing UI images. Maintaining the same content image while changing the UI image across the sequence of UI frames provides an appearance that the media content item has been paused. Maintaining the same content image across the sequence of UI frames reduces a number of bits that are transmitted to the client device 20 because non-changing portions of a UI frame need not be encoded thereby requiring fewer resources (e.g., less bandwidth and/or computing power) to transmit the sequence of UI frames to the client device 20.

Figure 1D:
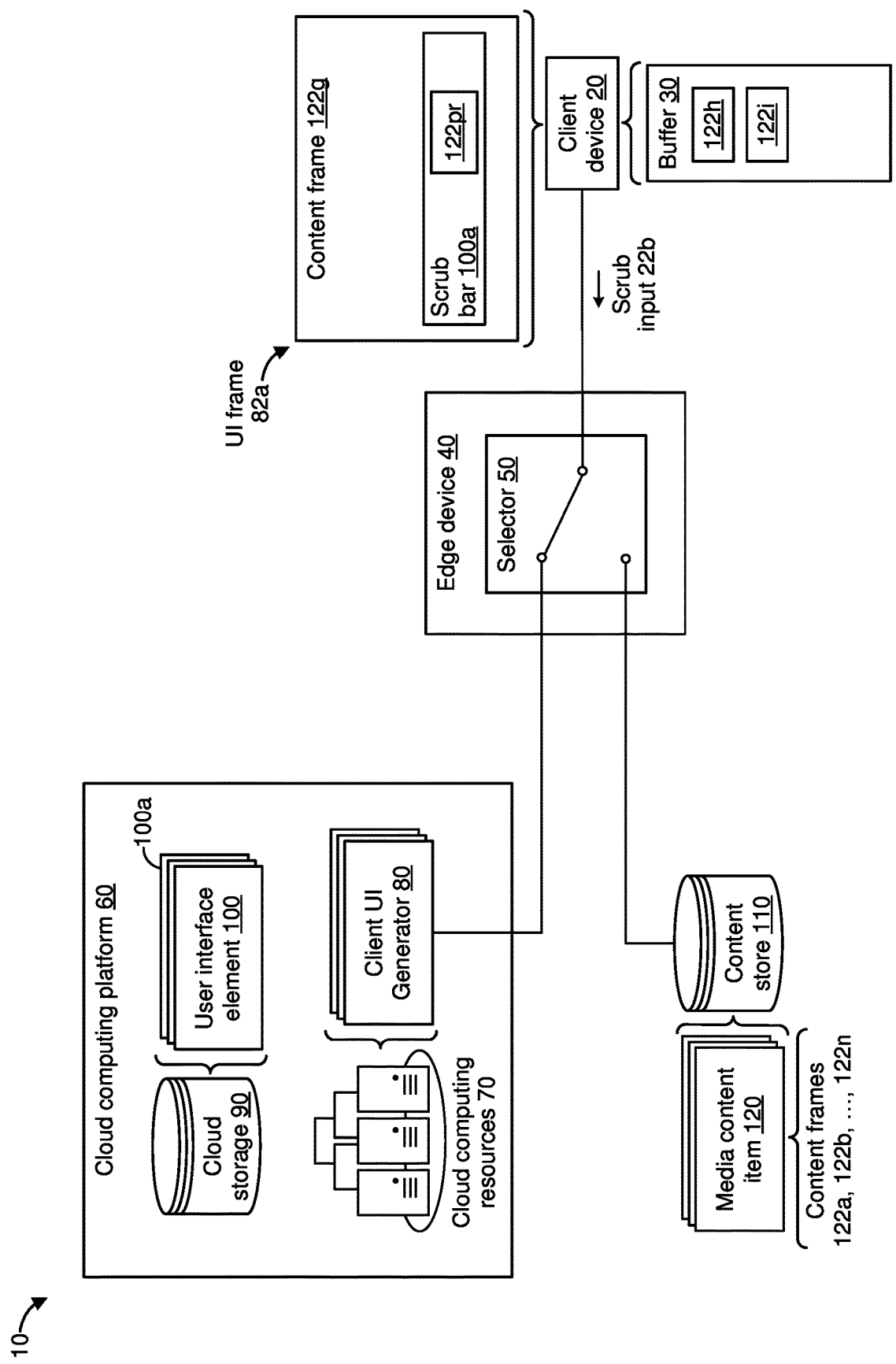

Referring to FIG. 1D, the client device 20 detects a user input that corresponds to a second portion of the scrub input 22b. For example, the client device 20 detects a subsequent press of the right arrow key on the remote control or the client device 20 detects a continuous press of the right arrow key on the remote control. The client device 20 provides an indication of the second portion of the scrub input 22b to the client UI generator 80 (e.g., via the edge device 40 as shown in FIG. 1D or directly).

Figure 1E:
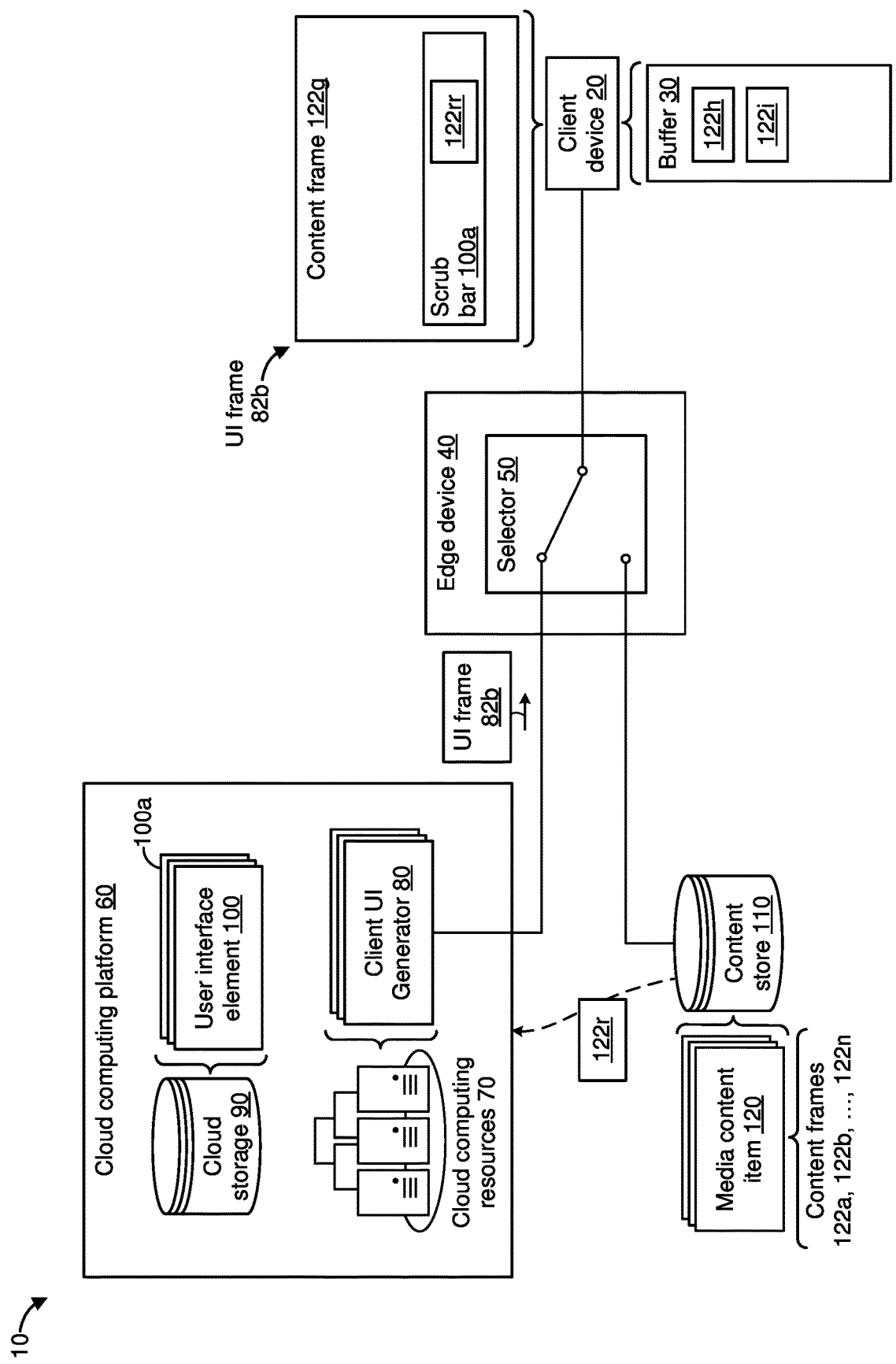

Referring to FIG. 1E, the client UI generator 80 generates a second UI frame 82b in response to obtaining the indication of the second portion of the scrub input 22b shown in FIG. 1D. In some implementations, the second portion of the scrub input 22b corresponds to a request to view a preview of an rth content frame 122r. As such, the client UI generator 80 retrieves the rth content frame 122r from the content store 110 and includes a reduced-size version 122rr of the rth content frame 122r in the second UI frame 82b. In the example of FIG. 1E, the client UI generator 80 has overlaid the reduced-size version 122rr of the rth content frame 122r on top of the scrub bar image 100a, and the client UI generator 80 has overlaid the scrub bar image 100a on top of the gth content frame 122g.

As shown in FIG. 1E, the client UI generator 80 generates the second UI frame 82b by blending the gth content frame 122g with the scrub bar image 100a and the reduced-size version 122rr of the rth content frame 122r. Since the second UI frame 82b includes the gth content frame 122g instead of the hth content frame 122h, presenting the second UI frame 82b after presenting the first UI frame 82a provides an appearance that the playback of the media content item 120 has been paused. Since the first UI frame 82a used the gth content frame 122g as a background, including the gth content frame 122g in the second UI frame 82b instead of the hth content frame 122h results in a fewer number of bits being used to represent the second UI frame 82b because the second UI frame 82b need not include bits corresponding to either the gth content frame 122g or the hth content frame 122h. For example, the second UI frame 82b may only include bits that indicate a difference between the first UI frame 82a and the second UI frame 82b (e.g., the second UI frame 82b may only include bits that correspond to the reduced-size version 122rr of the rth content frame 122r). Additionally, since the scrubbing operation is still ongoing, the edge device 40 (e.g., the selector 50) maintains the client device 20 in the real-time content presentation mode so that the client device 20 presents the second UI frame 82b instead of the hth content frame 122h that is stored in the buffer 30.

Figure 1F:
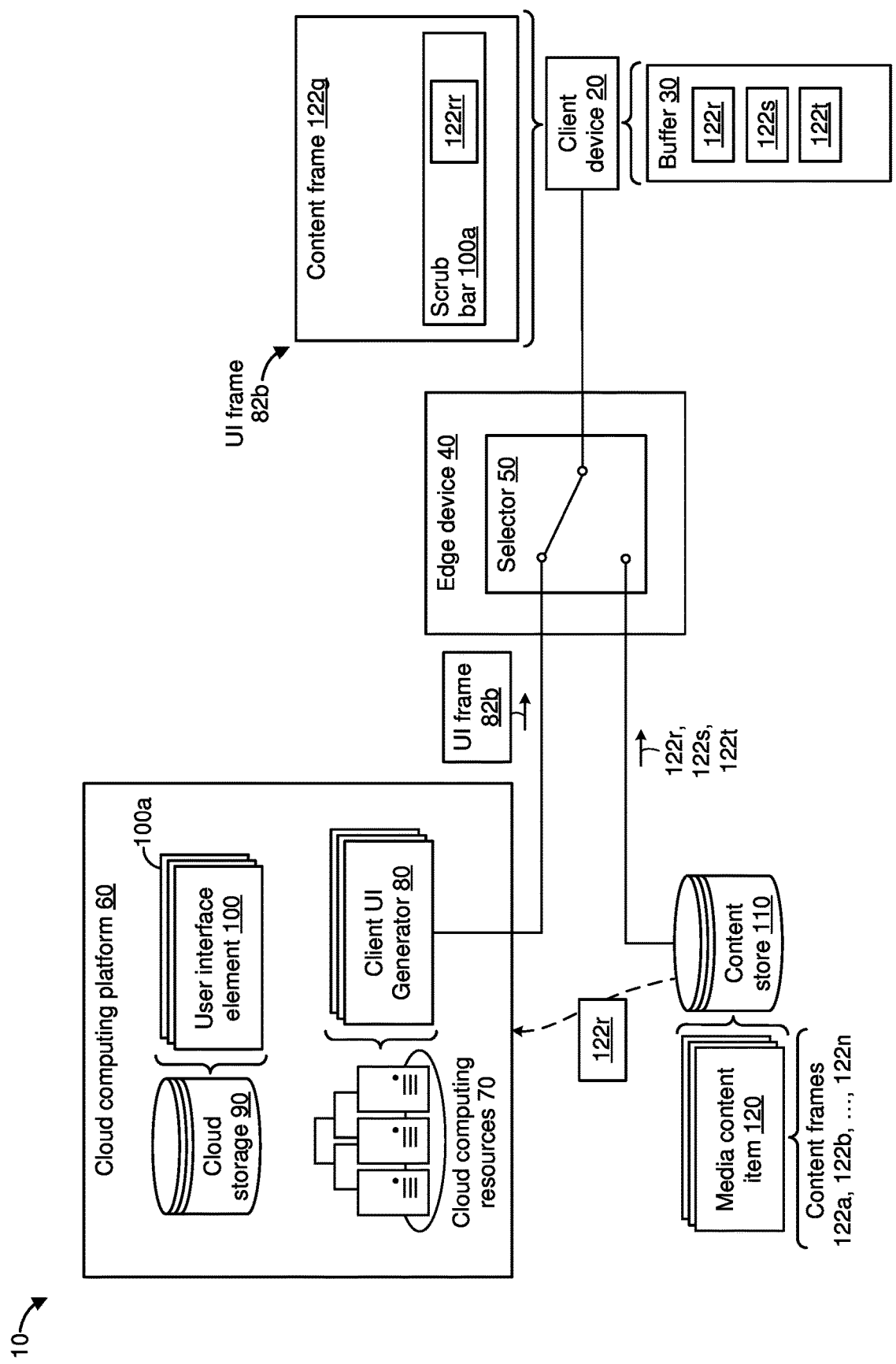

Referring to FIG. 1F, in some implementations, the client UI generator 80 and/or the edge device 40 (e.g., the selector 50) determine that the scrubbing operation is coming to an end. In some implementations, the client UI generator 80 determines that the scrubbing operation is coming to an end based on a slowdown in a speed of the scrubbing operation. In some implementations, the client UI generator 80 determines that the scrubbing operation is coming to an end based on a reduction in an intensity of a user input. For example, in some implementations, the client UI generator 80 determines that the scrubbing operation is coming to an end in response to the client device 20 indicating that the user has switched from holding down the right arrow key on the remote control to successively pressing the right arrow, or a speed at which the user is pressing the right arrow key has reduced.

In some implementations, the client UI generator 80 determines a new playback position (e.g., an expected new playback position) for resuming playback of the media content item 120, and instructs the edge device 40 to start transmitting content frames that correspond to the new playback position and for playback positions that occur after the new playback position. In the example of FIG. 1F, the edge device 40 identifies the rth content frame 122r as the new playback position, and the edge device 40 transmits the rth content frame 122r, an sth content frame 122s that occurs after the rth content frame 122r and a tth content frame 122t that occurs after the sth content frame 122s. As shown in FIG. 1F, the client device 20 stores the rth content frame 122r, the sth content frame 122s and the tth content frame 122t in the buffer 30 until playback resumes.

Figure 1G:
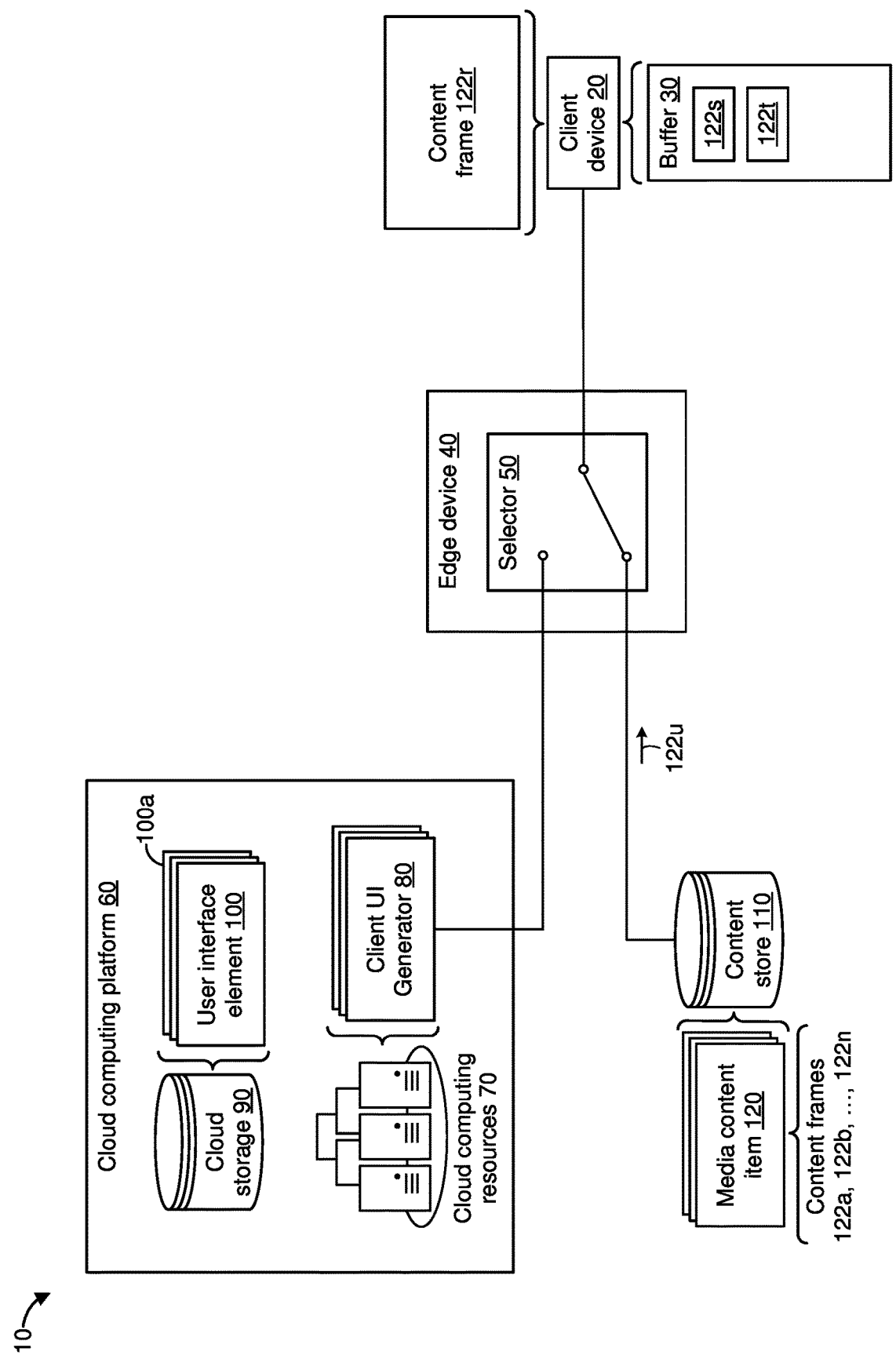

Referring to FIG. 1G, as indicated by a change in the position of the selector 50 relative to FIG. 1F, the selector 50 has switched the client device 20 from the real-time content presentation mode to the buffered content presentation mode. In response to being switched from the real-time content presentation mode to the buffered content presentation mode, the client device 20 retrieves content frames that are stored in the buffer 30 and presents the retrieved content frames on a display coupled with the client device 20 in a sequential manner. In the example of FIG. 1G, the client device 20 retrieves the rth content frame 122r from the buffer 30 and presents the rth content frame 122r on the display coupled with the client device 20. As such, in the example of FIG. 1G, the buffer 30 stores the sth content frame 122s and the tth content frame 122t. Additionally, the edge device 40 continues transmitting content frames that correspond to subsequent playback positions, for example, the edge device 40 transmits a uth content frame 122u to the client device 20.

Figure 1H:
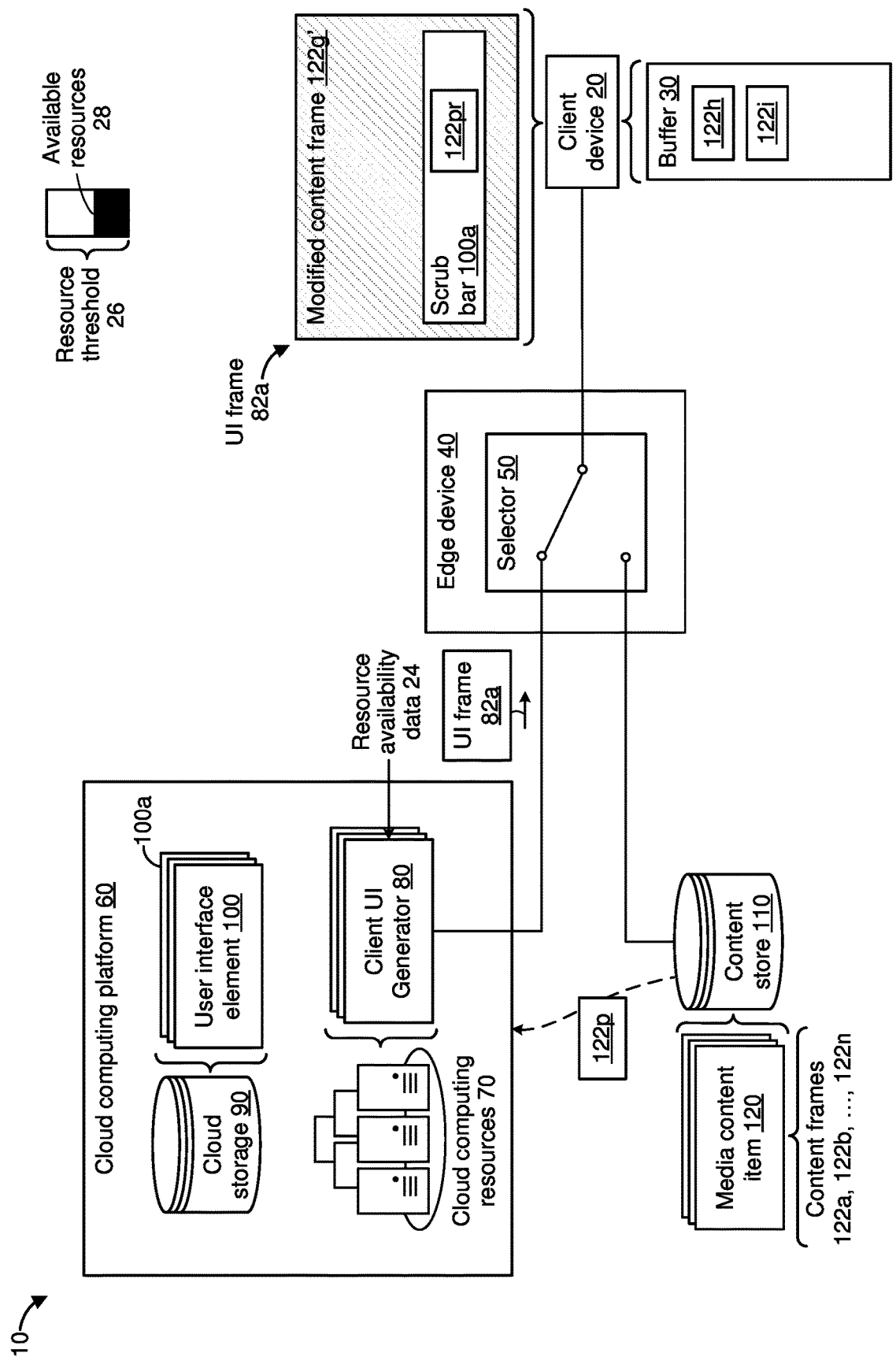

Referring to FIG. 1H, in some implementations, the client UI generator 80 generates the first UI frame 82a such that the first UI frame 82a includes a modified gth content frame 122g' instead of the gth content frame 122g in order to reduce a number of bits required to represent the first UI frame 82a. In some implementations, the modified gth content frame 122g' has a lower resolution than the gth content frame 122g. In some implementations, the modified gth content frame 122g' is a blurred version of the gth content frame 122g. In some implementations, the modified gth content frame 122g' has a smaller dimension than the gth content frame 122g. More generally, in various implementations, the gth content frame 122g is associated with a first visual characteristic value and the modified gth content frame 122g' is associated with a second visual characteristic value that is lower than the first visual characteristic value in order to reduce a number of bits that are required to represent the first UI frame 82a and subsequent UI frames.

Figure 1I:
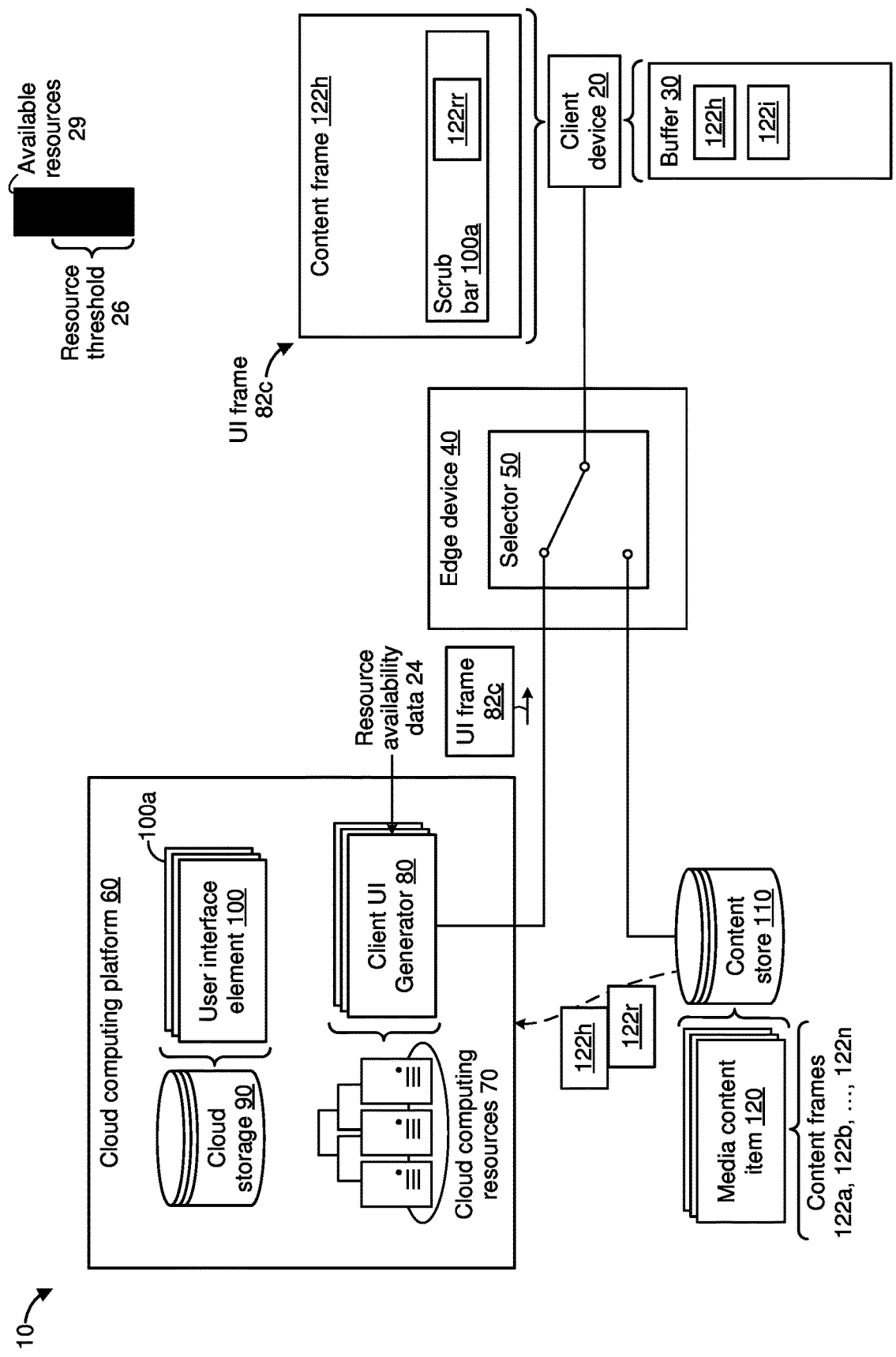

FIG. 1I illustrates generation of a third UI frame 82c as an alternative to generating the second UI frame 82b shown in FIGS. 1E and 1F. In the example of FIG. 1I, the resource availability data 24 indicates that an amount of resources 29 available to the client device 20 satisfies (e.g., exceeds) the resource threshold 26. For example, in some implementations, the resource availability data 24 indicates that an amount of bandwidth that is available to the client device exceeds a threshold amount of bandwidth. As such, the client UI generator 80 generates a sequence of video frames that provides an appearance that playback of the media content item 120 is continuing at the client device 20 while the user interface operation is being performed. In the example of FIG. 1I, the client UI generator 80 retrieves an hth content frame 122h from the content store 110 and blends the hth content frame 122h with the scrub bar image 100a in order to generate the third UI frame 82c. Since the hth content frame 122h corresponds to a playback position after the gth content frame 122g shown in FIG. 1C, presenting the third UI frame 82c immediately after presenting the first UI frame 82a provides an appearance that playback of the media content item 120 continues.

Figure 2:
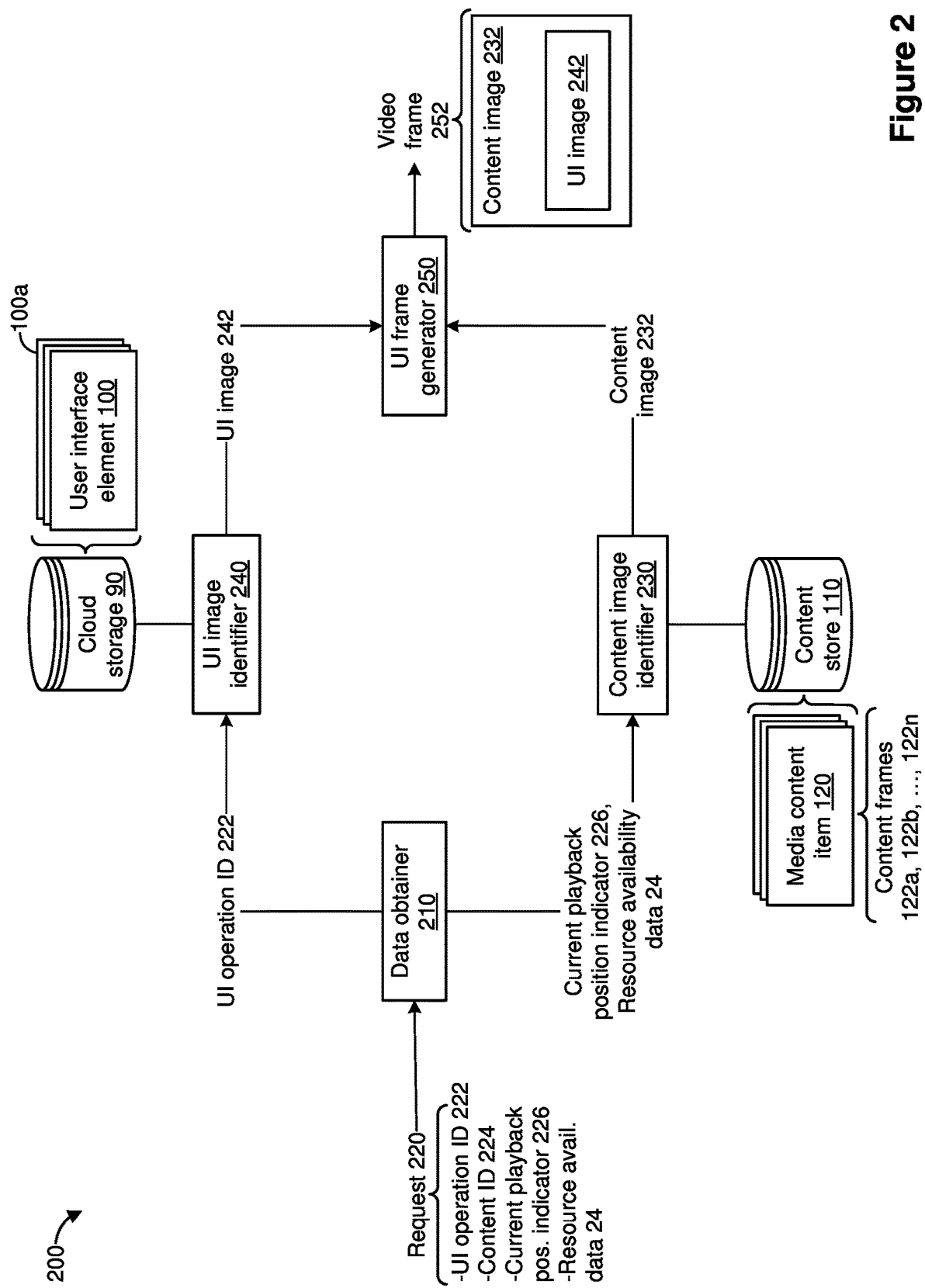
FIG. 2 is a block diagram of a video frame generation system in accordance with some implementations.

FIG. 2 illustrates a block diagram of a UI frame generation system 200 ("system 200", hereinafter for the sake of brevity) in accordance with some implementations. In some implementations, the system 200 is implemented by the cloud computing platform 60 (e.g., by the client UI generator 80) shown in FIGS. 1A-1I. For example, in some implementations, the system 200 resides at the cloud computing platform 60 (e.g., at an instance of the client UI generator 80). Alternatively, in some implementations, the system 200 resides at the edge device 40 shown in FIGS. 1A-1I. In some implementations, the system 200 is distributed across the cloud computing platform 60 and the edge device 40. For example, some components of the system 200 are implemented by the cloud computing platform 60 while a remainder of the components of the system 200 are implemented by the edge device 40.

In various implementations, the system 200 generates video frames that correspond to a user interface operation being performed at a client device (e.g., the client device 20 shown in FIGS. 1A-1I). To that end, in some implementations, the system 200 includes a data obtainer 210, a content image identifier 230, a UI image identifier 240 and a UI frame generator 250.

In various implementations, the data obtainer 210 obtains (e.g., receives) a request 220 to perform a user interface operation at a client device (e.g., the client device 20 shown in FIGS. 1A-1I) while the client device is playing a media content item (e.g., the media content item 120 shown in FIGS. 1A-1I). In some implementations, the user interface operation includes a scrubbing operation, a forward seek operation, a backward seek operation, a volume adjustment operation, a request to display information regarding the media content item that is currently playing at the client device, a request to display subtitles, etc.

In some implementations, the request 220 includes a UI operation identifier (ID) that identifies the requested user interface operation. In some implementations, the request 220 includes a content ID 224 that identifies the media content item that is currently being played at the client device. In some implementations, the request 220 includes a current playback position indicator 226 that indicates a current playback position of the client device 20. In some implementations, the current playback position indicator 226 includes a timestamp that indicates the current playback position. In some implementations, the current playback position indicator 226 includes a frame ID that identifies a content frame that is currently being presented at the client device.

In some implementations, the data obtainer 210 obtains the resource availability data 24. In some implementations, the resource availability data 24 is included in the request 220. As such, in some implementations, the data obtainer 210 receives the resource availability data 24 as a part of the request 220. In some implementations, the data obtainer 210 receives the resource availability data 24 separate from the request 220. For example, in some implementations, the data obtainer 210 periodically receives the resource availability data 24 from the client device. As described in relation to FIG. 1C, in some implementations, the resource availability data 24 indicates an amount of bandwidth and/or an amount of computing power that is available to the client device that generated the request 220.

In various implementations, the content image identifier 230 identifies a content image 232 that represents a current playback position indicated by the current playback position indicator 226. In some implementations, the current playback position indicator 226 includes a content frame ID that identifies a particular content frame, and the content image identifier 230 identifies the content image 232 by retrieving the particular content frame identified by the content frame ID. In some implementations, the current playback position indicator 226 includes a timestamp, and the content image identifier 230 identifies the content image 232 by retrieving a content frame that corresponds to the timestamp.

In some implementations, the content image 232 is within a similarity threshold of a content frame that corresponds to the current playback position indicated by the current playback position indicator 226. For example, a difference between the content image 232 and the content frame that corresponds to the current playback position indicated by the current playback position indicator 226 is less than a threshold (e.g., values of less than 5% of the pixels are different). In some implementations, the content image 232 was captured from the same point-of-view (e.g., same camera angle) as the content frame that is currently being played at the client device. In some implementations, the content store 110 stores various thumbnail images for the media content item that is currently being played at the client device, and the content image 232 is the thumbnail image that most closely matches the content frame currently being played at the client device.

In some implementations, the content frame currently being played at the client device is a delta frame (e.g., a P frame), and the content image 232 is a keyframe (e.g., a reference frame, for example, an I frame) that is within a similarity threshold of the delta frame. In some implementations, the content image identifier 230 selects a keyframe that is closest to the delta frame. For example, the content image identifier 230 selects the closest keyframe that occurs before the delta frame that is currently being played at the client device. In some implementations, selecting the keyframe reduces a need to decode intervening delta frames (e.g., delta frames that occur between the keyframe and the delta frame that is currently being played at the client device) thereby reducing an amount of time required to identify the content image 232.

In some implementations, the content store 110 stores pre-decoded versions of certain delta frames. For example, the content store 110 may store pre-decoded versions of every fifth delta frame. In such implementations, the content image identifier 230 retrieves a pre-decoded version of the closest pre-decoded delta frame that occurs before the delta frame that is currently being played at the client device. The content image identifier 230 decodes intervening delta frames (e.g., delta frames that occur between the closest pre-decoded delta frame and the delta frame that is currently being played) in order to identify the content image 232. In some implementations, storing pre-decoded versions of certain delta frames reduces a number of delta frames that need to be decoded in order to identify the content image 232 thereby reducing an amount of time required to identify the content image 232.

In some implementations, the content image identifier 230 identifies the content image 232 based on the resource availability data 24. In some implementations, as the user interface operation continues, the content image identifier 230 determines whether or not to change the content image 232 based on the resource availability data 24. In some implementations, if the resource availability data 24 indicates that an amount of resources (e.g., an amount of bandwidth) that is available to the client device is below a resource threshold (e.g., the resource threshold 26 shown in FIG. 1C), the content image identifier 230 maintains the content image 232 throughout the user interface operation. By contrast, if the resource availability data 24 indicates that the amount of resources that is available to the client device is greater than the resource threshold, the content image identifier 230 changes the content image 232 as the user interface operation continues.

In various implementations, the UI image identifier 240 identifies a UI image 242 that corresponds to a user interface operation indicated by the UI operation ID 222. In some implementations, the UI image 242 includes one of the UI images 100 stored in the cloud storage 90. In some implementations, the UI image 242 includes a modified version of one of the UI images 100 stored in the cloud storage 90. In some implementations, the UI image identifier 240 generates the UI image 242 by identifying a particular UI image 100 that corresponds to the user interface operation indicated by the UI operation ID 222, and the UI image identifier 240 modifies the particular UI image 100 based on a progress of the user interface operation.

In some implementations, the UI image 242 includes a blend of one of the UI images 100 (e.g., the scrub bar image 100a) and a reduced-size version of a content frame. For example, in some implementations, the UI image identifier 240 generates the UI image 242 by overlaying a reduced-size version of a content frame referenced by the request 220 on top of a particular one of the UI images 100 that corresponds to the UI operation ID 222. For example, as shown in FIG. 1C, the UI image identifier 240 overlays the reduced-size version 122pr of the pth content frame 122p on top of the scrub bar image 100a.

In various implementations, the UI frame generator 250 blends the content image 232 and the UI image 242 in order to generate a video frame 252 (e.g., the first UI frame 82a shown in FIGS. 1C, 1D and 1H, the second UI frame 82b shown in FIGS. 1E and 1F, and the third UI frame 82c shown in FIG. 1I). In some implementations, the UI frame generator 250 generates the video frame 252 by overlaying the UI image 242 on top of the content image 232. In some implementations, the UI frame generator 250 modifies the content image 232 such that the video frame 252 includes a modified version of the content image 232 (e.g., the modified gth content frame 122g' shown in FIG. 1H). For example, in some implementations, the UI frame generator 250 blurs the content image 232, reduces a dimension of the content image 232 and/or lowers a resolution of the content image 232, for example, in order to reduce a number of bits required to encode a portion of the video frame 252 that corresponds to the content image 232.

Figure 3:
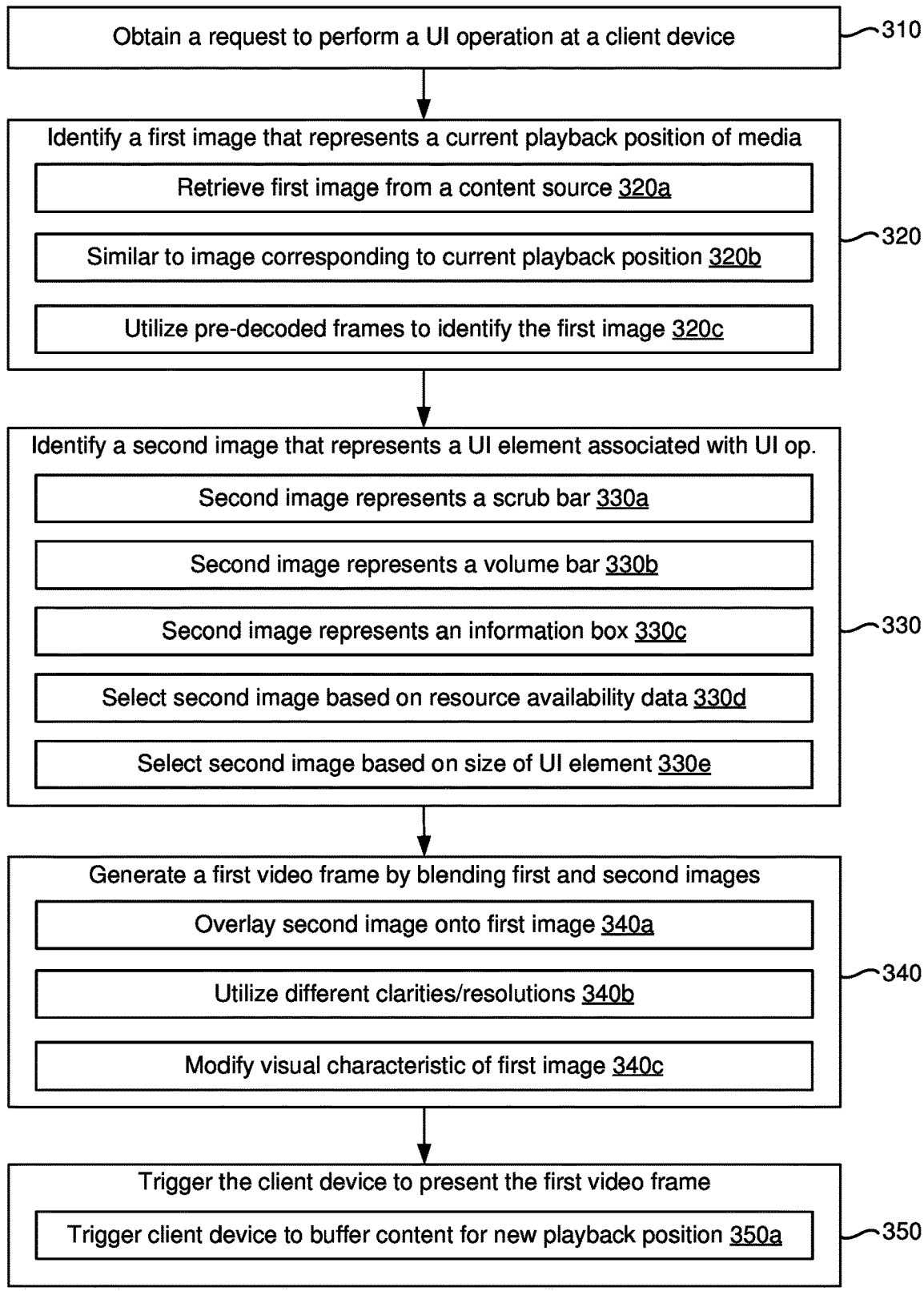
FIG. 3 is a flowchart representation of a method of generating a video frame for a user interface operation being performed at a client device in accordance with some implementations.

FIG. 3 is a flowchart representation of a method 300 for generating a video frame for a user interface operation being performed at a client device. In various implementations, the method 300 is performed by a device (e.g., by the edge device 40 and/or by the cloud computing platform 60, for example, by an instance of the client UI generator 80 instantiated in the cloud computing resources 70 shown in FIGS. 1A-1I). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining a request to perform a user interface operation at a client device while the client device is playing a media content item in a buffered content presentation mode. For example, as shown in FIG. 2, the data obtainer 210 receives the request 220 to perform a user interface operation identified by the UI operation ID 222 at a client device (e.g., at the client device 20 shown in FIGS. 1A-1I). In some implementations, the user interface operation includes a scrubbing operation. For example, as described in relation to FIG. 1B, the client UI generator 80 receives an indication of the first portion of the scrub input 22a from the client device 20. In some implementations, the user interface operation includes a seek operation (e.g., a forward seek operation or a backward seek operation). In some implementations, the user interface operation includes a volume adjustment operation (e.g., a request to increase or decrease a volume). In some implementations, the user interface operation includes a request to display information regarding the media content item that is currently playing on the client device. In some implementations, the user interface operation includes a request to display subtitles. In some implementations, the user interface operation includes a request to pause playback of the media content item.

In various implementations, the device performing the method 300 is not collocated with the client device. As such, in some implementations, the client device is referred to as a non-collocated client device or a remote client device. In various implementations, an amount of resources that is available to the client device is less than a threshold amount of resources (e.g., an amount of bandwidth that is available to the client device is less than a threshold amount of bandwidth and/or an amount of computing power that is available to the client device is less than a threshold amount of computing power). As such, in some implementations, the client device is referred to as a resource-limited client device (e.g., a bandwidth-limited client device and/or a power-limited client device) or a resource-constrained client device (e.g., a bandwidth-constrained client device and/or a power-constrained client device).

As represented by block 320, in some implementations, the method 300 includes identifying a first image that represents a current playback position of the media content item currently playing at the client device. For example, as described in relation to FIG. 1C, the client UI generator 80 identifies the gth content frame 122g as representative of a current playback position of the media content item 120 at the client device 20. As another example, as shown in FIG. 2, the content image identifier 230 identifies the content image 232 based on the current playback position indicator 226.

As represented by block 320a, in some implementations, identifying the first image includes retrieving the first image from a content source that stores the media content item. For example, as described in relation to FIG. 1C, in some implementations, the client UI generator 80 retrieves the gth content frame 122g from the content store 110. As another example, as shown in FIG. 2, the content image identifier 230 retrieves the content image 232 from the content store 110. In some implementations, the content source includes a cache of the device (e.g., a cache of the client UI generator 80 shown in FIGS. 1A-1I). In some implementations, the content source includes a content store (e.g., the content store 110 shown in FIGS. 1A-2).

As represented by block 320b, in some implementations, the first image is within a similarity threshold of a third image that corresponds to the current playback position. For example, as described in relation to FIG. 2, in some implementations, the content image identifier 230 selects the content image 232 from the content frames 122a, 122b, . . . , and 122n such that the content image 232 is similar to a content frame that is currently being played by the client device. In some implementations, retrieving a similar content frame is less resource-intensive (e.g., faster) than retrieving the exact content frame that the client device is currently playing thereby conserving computing resources of the device.

In some implementations, the current playback position corresponds to a delta frame and the first image corresponds to a keyframe. For example, as described in relation to FIG. 2, in some implementations, the current playback position indicator 226 indicates that the content frame currently being played at the client device is a delta frame, and the content image 232 selected by the content image identifier 230 includes a keyframe that is similar to the delta frame. In some implementations, the keyframe is within a temporal threshold of the delta frame that is currently playing on the client device. In some implementations, the first image is a keyframe that is closest to the delta frame. In some implementations, the first image is the closest keyframe that appears before the delta frame. In some implementations, the first image is the closest keyframe that appears after the delta frame. In some implementations, selecting a keyframe as being representative of a delta frame currently being played by the client device reduces a number of frames that need to be decoded (e.g., by reducing a need to decode intervening delta frames that occur between the keyframe and the delta frame that is currently being played by the client device) thereby conserving computing resources and reducing a time required to identify the first image.

As represented by block 320*c*, in some implementations, the method 300 includes, prior to obtaining the request to perform the user interface operation, decoding a subset of delta frames of the media content item, and storing decoded versions of the delta frames in the subset of delta frames. For example, as described in relation to FIG. 2, in some implementations, the system 200 (e.g., the content image identifier 230) may decode every fifth delta frame in advance, and store decoded versions of every fifth delta frame in the content store 110. In some implementations, identifying the first image that represents the current playback position of the media content item includes determining that the current playback position corresponds to a delta frame. In some implementations, the method 300 includes, in response to the current playback position corresponding to a delta frame that has been decoded, retrieving a decoded version of the delta frame. For example, if the content store 110 stores a pre-decoded version of the delta frame that is currently playing at the client device, the content image identifier 230 retrieves the pre-decoded version of the delta frame. In this example, the content image identifier 230 conserves time by not decoding delta frames that occur between the delta frame that is currently playing at the client device and the last keyframe. In some implementations, the method 300 includes, in response to the current playback position corresponding to a delta frame that has not been decoded, retrieving a decoded version of the nearest delta frame and decoding intervening delta frames at an increased decode rate (e.g., a decode rate that is faster than a default decode rate, for example, at a multiple of the default decode rate). For example, if the content store 110 does not store a pre-decoded version of the delta frame that is currently playing at the client device, the content image identifier 230 retrieves a pre-decoded version of the nearest delta frame that occurs before the delta frame that is currently playing at the client device, and the content image identifier 230 decodes intervening delta frames at an increased decode rate (e.g., at four times a default decode rate). In this example, the content image identifier 230 conserves time by not decoding delta frames that occur between the pre-decoded delta frame and the last keyframe that occurs before the pre-decoded delta frame.

As represented by block 330, in some implementations, the method 300 includes identifying a second image that represents a user interface element associated with the user interface operation. In some implementations, the user interface element associated with the user interface operation includes a user interface element that is invoked by the user interface operation. As shown in FIG. 2, the UI image identifier 240 identifies the UI image 242 that represents a user interface element associated with the user interface operation.

As represented by block 330*a*, in some implementations, the user interface operation includes a scrubbing operation, the user interface element includes a scrub bar, and the second image includes an image of the scrub bar. For example, as described in relation to FIG. 1C, the client UI generator 80 selects the scrub bar image 100*a* in response to obtaining an indication of the first portion of the scrub input 22*a* shown in FIG. 1B.

In some implementations, the second image that represents the scrub bar includes a reduced-size version of a third image corresponding to a second playback position of the media content item requested by the scrubbing operation. For example, as shown in FIG. 1C, the reduced-size version 122*pr* of the pth content frame 122 is overlaid on top of the scrub bar image 100*a*.

As represented by block 330*b*, in some implementations, the user interface operation includes a volume adjustment operation, the user interface element includes a volume bar, and the second image includes an image of the volume bar. For example, in some implementations, the UI image 242 shown in FIG. 2 includes an image of a volume bar when the request 220 indicates that a user of the client device is increasing or decreasing the volume.

As represented by block 330*c*, in some implementations, the user interface operation includes a request to display metadata associated with the media content item, the user interface element includes a text box with a description of the media content item, and the second image includes an image of the text box. For example, in some implementations, the UI image 242 shown in FIG. 2 depicts a text box that displays information (e.g., a synopsis, cast, etc.) regarding the media content item indicated by the content ID 224.

As represented by block 330*d*, in some implementations, the second image represents a first state of the user interface element. In some implementations, the method 300 includes obtaining resource availability data indicative of an amount of resources (e.g., an amount of bandwidth and/or an amount of computing power) that is available to the client device. In some implementations, the method 300 includes, in response to the amount of resources that is available to the client device being less than a threshold amount of resources, generating a second video frame that corresponds to the user interface operation by blending the first image with a third image that represents a second state of the user interface element as the user interface operation continues (e.g., in order to reduce a number of bits required to represent the second video frame). For example, as shown in FIG. 1E, the client UI generator 80 generates the second UI frame 82*b* by blending the same gth content frame 122*g* used in the first UI frame 82*a* with the scrub bar image 100*a* and the reduced-size version 122*rr* of the rth content frame 122*r*. In some implementations, the method 300 includes, in response to the amount of resources that is available to the client device being greater than the threshold amount of resources, generating the second video frame that corresponds to the user interface operation by blending a fourth image that represents a subsequent playback position of the media content item with the third image that represents the second state of the user interface element. For example, as shown in FIG. 1I, the client UI generator 80 generates the third UI frame 82*c* by blending the hth content frame 122*h* with the scrub bar image 100*a* and the reduced-size version 122*rr* of the rth content frame 122*r*.

As represented by block 330e, in some implementations, the second image represents a first state of the user interface element. In some implementations, the method 300 includes determining a size of the user interface element (e.g., a dimension of the user interface element, for example, a number of pixels that the user interface element occupies). In some implementations, the method 300 includes, in response to the size of the user interface element being greater than a threshold size, generating a second video frame that corresponds to the user interface operation by blending the first image with a third image that represents a second state of the user interface element as the user interface operation continues (e.g., pausing the playback of the media content item in order to reduce a number of bits required to represent the second video frame when the user interface element is relatively large and the user is not expected to focus on the media content item). In some implementations, the method 300 includes, in response to the size of the user interface element being less than the threshold size, generating the second video frame that corresponds to the user interface operation by blending a fourth image that represents a subsequent playback position of the media content item with the third image that represents the second state of the user interface element (e.g., allowing the playback of the media content item to continue when the user interface element is relatively small and the user is expected to focus on the media content item).

As represented by block 340, in some implementations, the method 300 includes generating a first video frame that corresponds to the user interface operation by blending the first image with the second image. For example, as shown in FIG. 1C, the client UI generator 80 generates the first UI frame 82a by blending the gth content frame 122g with the scrub bar image 100a. As another example, as shown in FIG. 2, the UI frame generator 250 generates the video frame 252 by blending the content image 232 with the UI image 242.

As represented by block 340a, in some implementations, generating the first video frame includes overlaying the second image that represents the user interface element onto a portion of the first image that represents the current playback position of the media content item. For example, as shown in FIG. 1C, the client UI generator 80 generates the first UI frame 82a by overlaying the scrub bar image 100a onto a portion of the gth content frame 122g. As another example, as shown in FIG. 2, the UI frame generator 250 generates the video frame 252 by overlaying the UI image 242 onto a portion of the content image 232. In some implementations, the first image (e.g., the content image 232 shown in FIG. 2) serves as a background and the second image (e.g., the UI image 242 shown in FIG. 2) serves as a foreground.

As represented by block 340b, in some implementations, generating the first video frame comprises blurring the first image that represents the current playback position of the media content item while not blurring the second image that represents the user interface element (e.g., in order to reduce a number of bits being transmitted to the client device). For example, as shown in FIG. 1H, in some implementations, the client UI generator 80 generates the first UI frame 82a such that the first UI frame 82a includes the modified gth content frame 122g' (e.g., a blurred version of the gth content frame 122g).

In some implementations, a first portion of the first video frame corresponding to the first image is associated with a first resolution and a second portion of the first video frame corresponding to the second image is associated with a second resolution that is greater than the first resolution (e.g., in order to reduce a number of bits being transmitted to the client device). As an example, referring to FIG. 1C, in some implementations, a first portion of the first UI frame 82a that corresponds to the gth content frame 122g is displayed at a first resolution and a second portion of the first UI frame 82a that corresponds to the scrub bar image 100a is displayed at a second resolution that is greater than the first resolution.

As represented by block 340c, in some implementations, the first image is associated with a first visual characteristic value that is less than a second visual characteristic value associated with the playing of the media content item at the client device. As an example, the gth content frame 122g is displayed at a first size in FIG. 1B when the client device 20 is in the buffered content presentation mode, and the gth content frame 122g is displayed at a second size in FIG. 1C that is smaller than the first size in FIG. 1B when the client device 20 is in the real-time content presentation mode. As another example, the gth content frame 122g is displayed with a first clarity in FIG. 1B and the gth content frame 122g is displayed with a second clarity in FIG. 1C that is less than the first clarity in FIG. 1B. As another example, the gth content frame 122g is displayed with a first resolution in FIG. 1B and the gth content frame 122g is displayed with a second resolution in FIG. 1C that is less than the first resolution in FIG. 1B. As another example, the gth content frame 122g is associated with a first frame rate in FIG. 1B and the gth content frame 122g is associated with a second frame rate in FIG. 1C that is lower than the first frame rate in FIG. 1B.

As represented by block 350, in some implementations, the method 300 includes triggering the client device to present the first video frame in a real-time content presentation mode. For example, as shown in FIG. 1C, the client UI generator 80 transmits the first UI frame 82a to the client device 20 via the edge device 40, and the client UI generator 80 and/or the edge device 40 instruct the client device 20 to present the first UI frame 82a in the real-time content presentation mode (e.g., without first storing the first UI frame 82a in the buffer 30).

As represented by block 350a, in some implementations, the method 300 includes detecting that the user interface operation includes a scrubbing operation that has ended at a new playback position. In some implementations, the method 300 includes instructing the client device to clear a buffer of the client device and to start storing video frames that correspond to playback positions after the new playback position. In some implementations, the method 300 includes triggering the client device to transition from the real-time content presentation mode to the buffered content presentation mode when the buffer stores a threshold number of the video frames that correspond to playback positions after the new playback position. For example, as shown in FIG. 1F, the client UI generator 80 and/or the edge device 40 detect that the scrubbing operation has ended at a new playback position corresponding to the rth content frame 122r. As such, in the example of FIG. 1F, the edge device 40 transmits the rth content frame 122r, the sth content frame 122s and the tth content frame 122t to the client device 20, and the client device 20 stores the rth content frame 122r, the sth content frame 122s and the tth content frame 122t in the buffer 30. As shown in FIG. 1G, the client device 20 switches from the real-time content presentation mode to the buffered content presentation mode, retrieves the rth content frame 122r from the buffer 30, and presents the rth content frame 122r.

In some implementations, the method 300 includes determining an expected new playback position based on a slowing of the scrubbing operation at the client device, and instructing the client device to clear a buffer of the client device and to start storing video frames that correspond to playback positions after the expected new playback position. For example, as described herein, in some implementations, the device detects that the user has switched from continuously pressing the right arrow key on the remote control of the client device to providing successive presses of the right arrow key.

Figure 4:
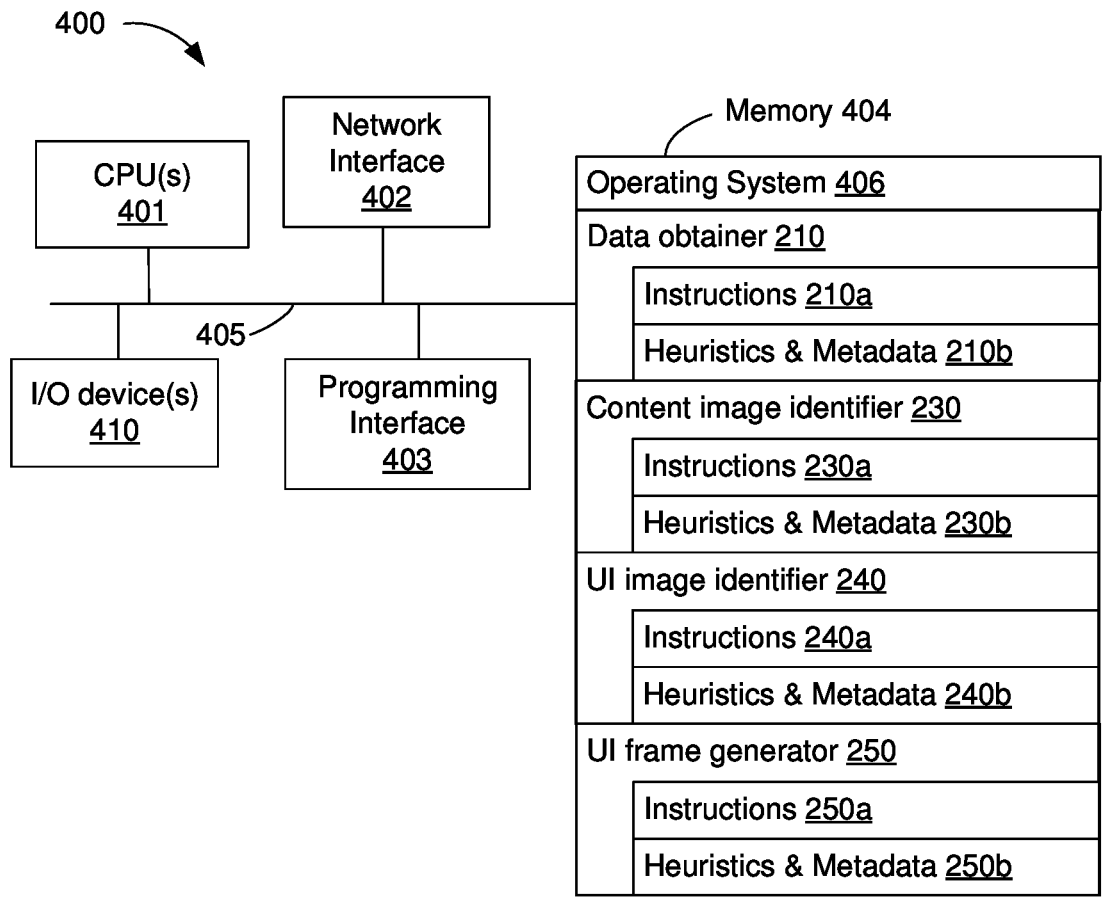
FIG. 4 is a block diagram of a device that generates a video frame for a user interface operation being performed at a client device in accordance with some implementations.

FIG. 4 is a block diagram of a device 400 in accordance with some implementations. In some implementations, the device 400 implements the cloud computing platform 60, the client UI generator 80 and/or the edge device 40 shown in FIGS. 1A-1I, and/or the system 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (110) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the content image identifier 230, the UI image identifier 240 and the UI frame generator 250. In various implementations, the device 400 performs the method 300 shown in FIG. 3.

In some implementations, the data obtainer 210 includes instructions 210a, and heuristics and metadata 210b for obtaining a request to perform a user interface operation at a client device while the client device is playing a media content item in a buffered content presentation mode. In some implementations, the data obtainer 210 performs at least some of the operation(s) represented by block 310 in FIG. 3.

In some implementations, the content image identifier 230 includes instructions 230a, and heuristics and metadata 230b for identifying a first image that represents a current playback position of the media content item at the client device. In some implementations, the content image identifier 230 performs at least some of the operation(s) represented by block 320 in FIG. 3.

In some implementations, the UI image identifier 240 includes instructions 240a, and heuristics and metadata 240b for identifying a second image that represents a user interface element associated with the user interface operation. In some implementations, the UI image identifier 240 performs at least some of the operation(s) represented by block 330 in FIG. 3.

In some implementations, the UI frame generator 250 includes instructions 250a, and heuristics and metadata 250b for generating a first video frame that corresponds to the user interface operation by blending the first image with the second image. In some implementations, the UI frame generator 250 performs at least some of the operation(s) represented by block 340 in FIG. 3.

In some implementations, the one or more I/O devices 410 include a receiver for receiving the request and a transmitter for transmitting the video frame.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including a non-transitory memory and one or more processors:
obtaining a request to perform a user interface operation at a client device while the client device is playing a media content item in a buffered content presentation mode;
identifying a first image that represents a current playback position of the media content item at the client device;
identifying a second image that represents a user interface element associated with the user interface operation;
generating a first video frame that corresponds to the user interface operation by blending the first image with the second image;

transmitting the first video frame to the client device; and triggering the client device to switch from the buffered content presentation mode to a real-time content presentation mode and present the first video frame in the real-time content presentation mode.

2. The method of claim 1, wherein generating the first video frame comprises overlaying the second image that represents the user interface element onto a portion of the first image that represents the current playback position of the media content item.

3. The method of claim 1, wherein generating the first video frame comprises blurring the first image that represents the current playback position of the media content item while not blurring the second image that represents the user interface element.

4. The method of claim 1, wherein a first portion of the first video frame corresponding to the first image is associated with a first resolution and a second portion of the first video frame corresponding to the second image is associated with a second resolution that is greater than the first resolution.

5. The method of claim 1, wherein identifying the first image comprises retrieving the first image from a content source that stores the media content item.

6. The method of claim 1, wherein the user interface operation includes a scrubbing operation, the user interface element includes a scrub bar, and the second image includes an image of the scrub bar.

7. The method of claim 6, wherein the second image that represents the scrub bar includes a reduced-size version of a third image corresponding to a second playback position of the media content item requested by the scrubbing operation.

8. The method of claim 6, further comprising:
detecting that the scrubbing operation has ended at a new playback position;
instructing the client device to clear a buffer of the client device and to start storing video frames that correspond to playback positions after the new playback position; and
triggering the client device to transition from the real-time content presentation mode to the buffered content presentation mode when the buffer stores a threshold number of the video frames that correspond to playback positions after the new playback position.

9. The method of claim 6, further comprising:
determining an expected new playback position based on a slowing of the scrubbing operation at the client device; and
instructing the client device to clear a buffer of the client device and to start storing video frames that correspond to playback positions after the expected new playback position.

10. The method of claim 1, wherein the user interface operation includes a volume adjustment operation, the user interface element includes a volume bar, and the second image includes an image of the volume bar.

11. The method of claim 1, wherein the user interface operation includes a request to display metadata associated with the media content item, the user interface element includes a text box with a description of the media content item, and the second image includes an image of the text box.

12. The method of claim 1, wherein the second image represents a first state of the user interface element, and the method further comprises:

obtaining resource availability data indicative of an amount of resources that is available to the client device;
in response to the amount of resources that is available to the client device being less than a threshold amount of resources, generating a second video frame that corresponds to the user interface operation by blending the first image with a third image that represents a second state of the user interface element as the user interface operation continues; and
in response to the amount of resources that is available to the client device being greater than the threshold amount of resources, generating the second video frame that corresponds to the user interface operation by blending a fourth image that represents a subsequent playback position of the media content item with the third image that represents the second state of the user interface element.

13. The method of claim 1, wherein the second image represents a first state of the user interface element, and the method further comprises:
determining a size of the user interface element;
in response to the size of the user interface element being greater than a threshold size, generating a second video frame that corresponds to the user interface operation by blending the first image with a third image that represents a second state of the user interface element as the user interface operation continues; and
in response to the size of the user interface element being less than the threshold size, generating the second video frame that corresponds to the user interface operation by blending a fourth image that represents a subsequent playback position of the media content item with the third image that represents the second state of the user interface element.

14. The method of claim 1, wherein the first image is within a similarity threshold of a third image that corresponds to the current playback position.

15. The method of claim 1, wherein the current playback position corresponds to a delta frame and the first image corresponds to a keyframe.

16. The method of claim 1, wherein the first image is associated with a first visual characteristic value that is less than a second visual characteristic value associated with the playing of the media content item at the client device.

17. The method of claim 1, further comprising:
prior to obtaining the request to perform the user interface operation:
decoding a subset of delta frames of the media content item; and
storing decoded versions of the subset of delta frames; and
wherein identifying the first image that represents the current playback position of the media content item comprises:
determining that the current playback position corresponds to a delta frame;
in response to the current playback position corresponding to a delta frame that has been decoded, retrieving a decoded version of the delta frame; and
in response to the current playback position corresponding to a delta frame that has not been decoded, retrieving a decoded version of the nearest delta frame and decoding intervening delta frames at an increased decode rate.

18. A device comprising:
one or more processors;
a non-transitory memory; and
one or more programs stored in the non-transitory memory, which, when executed by the one or more processors, cause the device to:
  obtain a request to perform a user interface operation at a client device while the client device is playing a media content item in a buffered content presentation mode;
  identify a first image that represents a current playback position of the media content item at the client device;
  identify a second image that represents a user interface element associated with the user interface operation;
  generate a first video frame that corresponds to the user interface operation by blending the first image with the second image;
  transmit the first video frame to the client device; and
  trigger the client device to switch from the buffered content presentation mode to a real-time content presentation mode and present the first video frame in the real-time content presentation mode.

19. A non-transitory memory storing one or more programs, which, when executed by one or more processors of a device, cause the device to:
  obtain a request to perform a user interface operation at a client device while the client device is playing a media content item in a buffered content presentation mode;
  identify a first image that represents a current playback position of the media content item at the client device;
  identify a second image that represents a user interface element associated with the user interface operation;
  generate a first video frame that corresponds to the user interface operation by blending the first image with the second image;
  transmit the first video frame to the client device; and
  trigger the client device to switch from the buffered content presentation mode to a real-time content presentation mode and present the first video frame in the real-time content presentation mode.

20. The non-transitory memory of claim 19, wherein generating the first video frame comprises overlaying the second image that represents the user interface element onto a portion of the first image that represents the current playback position of the media content item.

* * * * *